E. VIGUIE & R. G. FORGET.
MOTOR FORE CARRIAGE FOR VEHICLES.
APPLICATION FILED JULY 22, 1908.
938,094.
Patented Oct. 26, 1909.
4 SHEETS—SHEET 2.
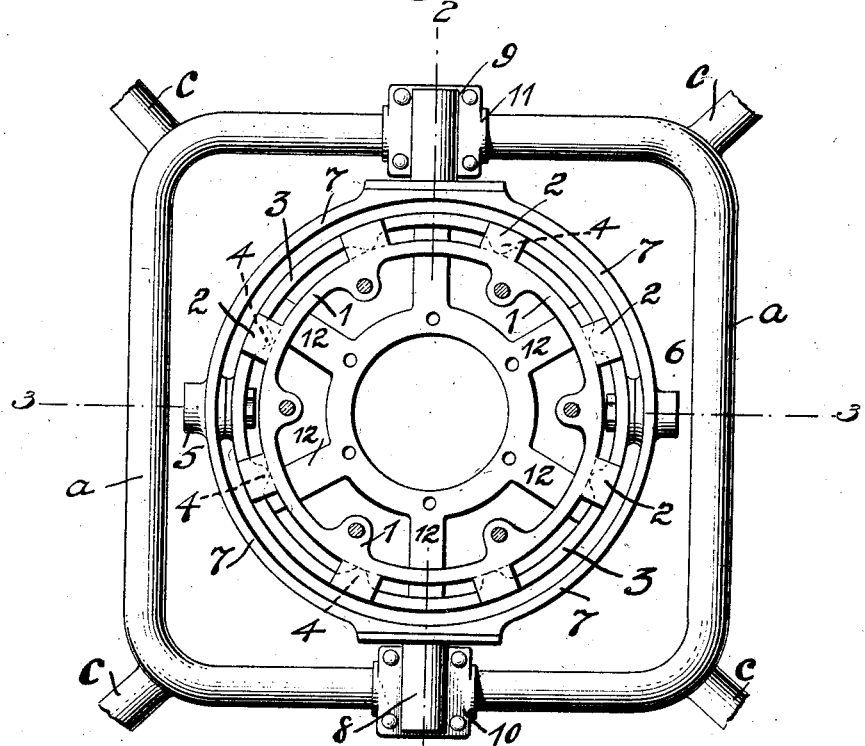
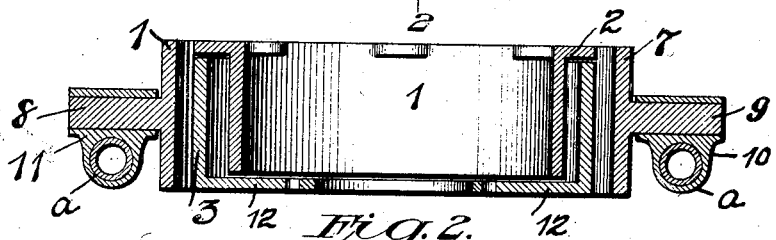
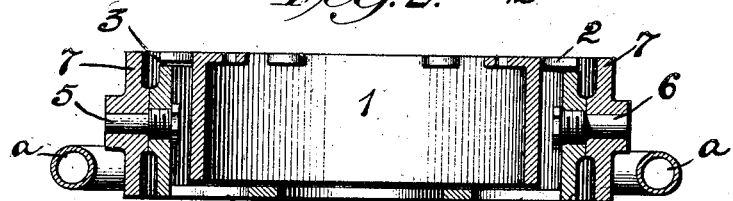
Witnesses:
Inventors
Emile Viguie and
Robert Gustave Forget
By
atty.

E. VIGUIE & R. G. FORGET.
MOTOR FORE CARRIAGE FOR VEHICLES.
APPLICATION FILED JULY 22, 1908.
938,094.
Patented Oct. 26, 1909.
4 SHEETS—SHEET 3.
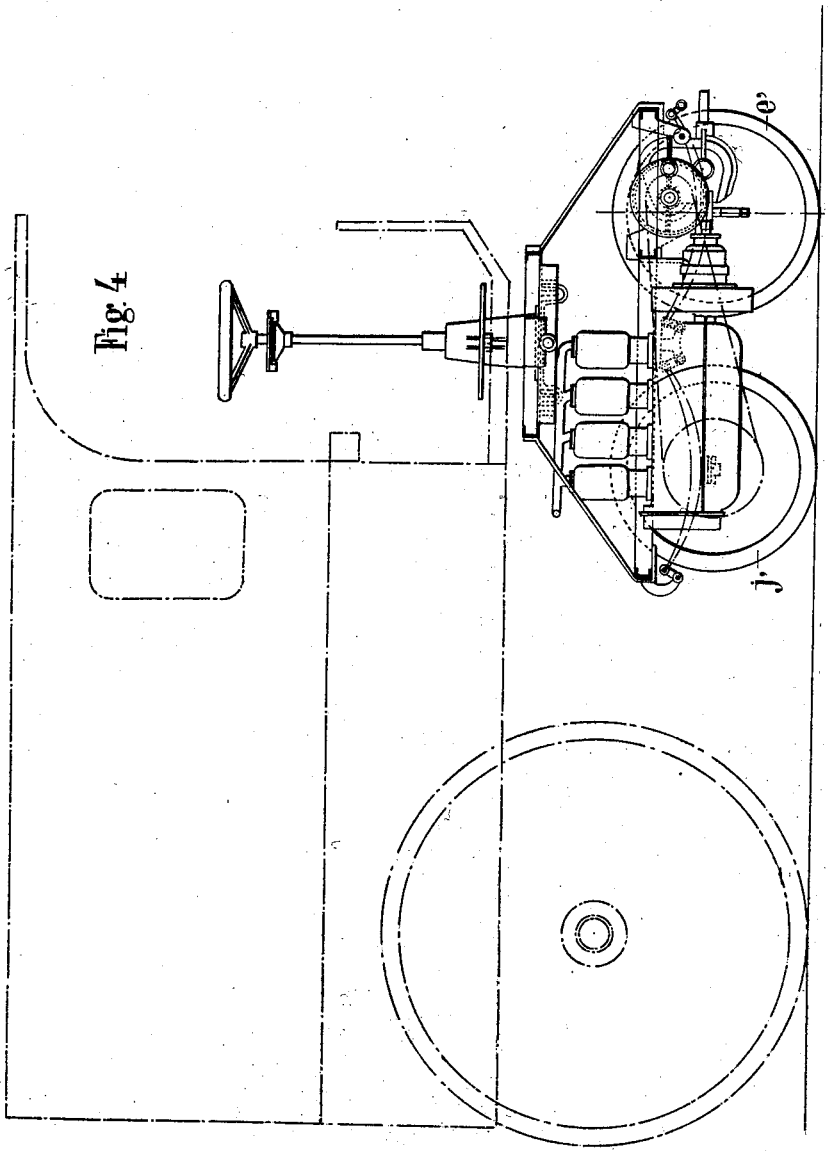
WITNESSES
Jos J Collins
L. R. Nevitt
INVENTORS
Emile Viguie and
Robert Gustave Forget
By Emile Bonnielyche
ATTORNEY E. VIGUIE & R. G. FORGET.
MOTOR FORE CARRIAGE FOR VEHICLES.
APPLICATION FILED JULY 22, 1908.

938,094.

Patented Oct. 26, 1909.
4 SHEETS—SHEET 4.

WITNESSES
Jos. F. Collins
L. R. Nevitt

INVENTORS
Emile Viguie and
Robert Gustave Forget
By Emile Börnelycke
ATTORNEY

UNITED STATES PATENT OFFICE.

EMILE VIGUIE AND ROBERT GUSTAVE FORGET, OF PARIS, FRANCE.

MOTOR FORE-CARRIAGE FOR VEHICLES.

938,094.  Specification of Letters Patent.  Patented Oct. 26, 1909.

Application filed July 22, 1908. Serial No. 444,721.

*To all whom it may concern:*

Be it known that we, EMILE VIGUIE and ROBERT GUSTAVE FORGET, citizens of the Republic of France, and residents of Paris, France, have invented a new and useful Motor Fore-Carriage for Vehicles, which is fully set forth in the following specification.

This invention relates to an independent motor fore-carriage device adapted to be used in connection with vehicles of all kinds and more particularly as hereinafter described in connection with hackney carriages, private carriages, light delivery vans and similar vehicles.

The device takes the place of the usual fore-carriage for the purpose of substituting mechanical traction for animal traction while keeping the same coach work and the general arrangement of the vehicle.

The construction of the motor fore-carriage hereinafter described is chiefly characterized by a method of attachment enabling the wheels to rise and descend without affecting the driver's seat. The motor fore-carriage can have three as well as four wheels, two of which would be the driving and the two others the steering wheels, the steering movement of the latter being obtained from the box seat by means of a device similar to that used in ordinary motor vehicles. This latter device is more particularly applicable to delivery carts, vans and other vehicles of comparatively increased weight.

Two constructions of the motor fore-carriage according to this invention are illustrated by way of example in the accompanying drawings.

Figure 1:
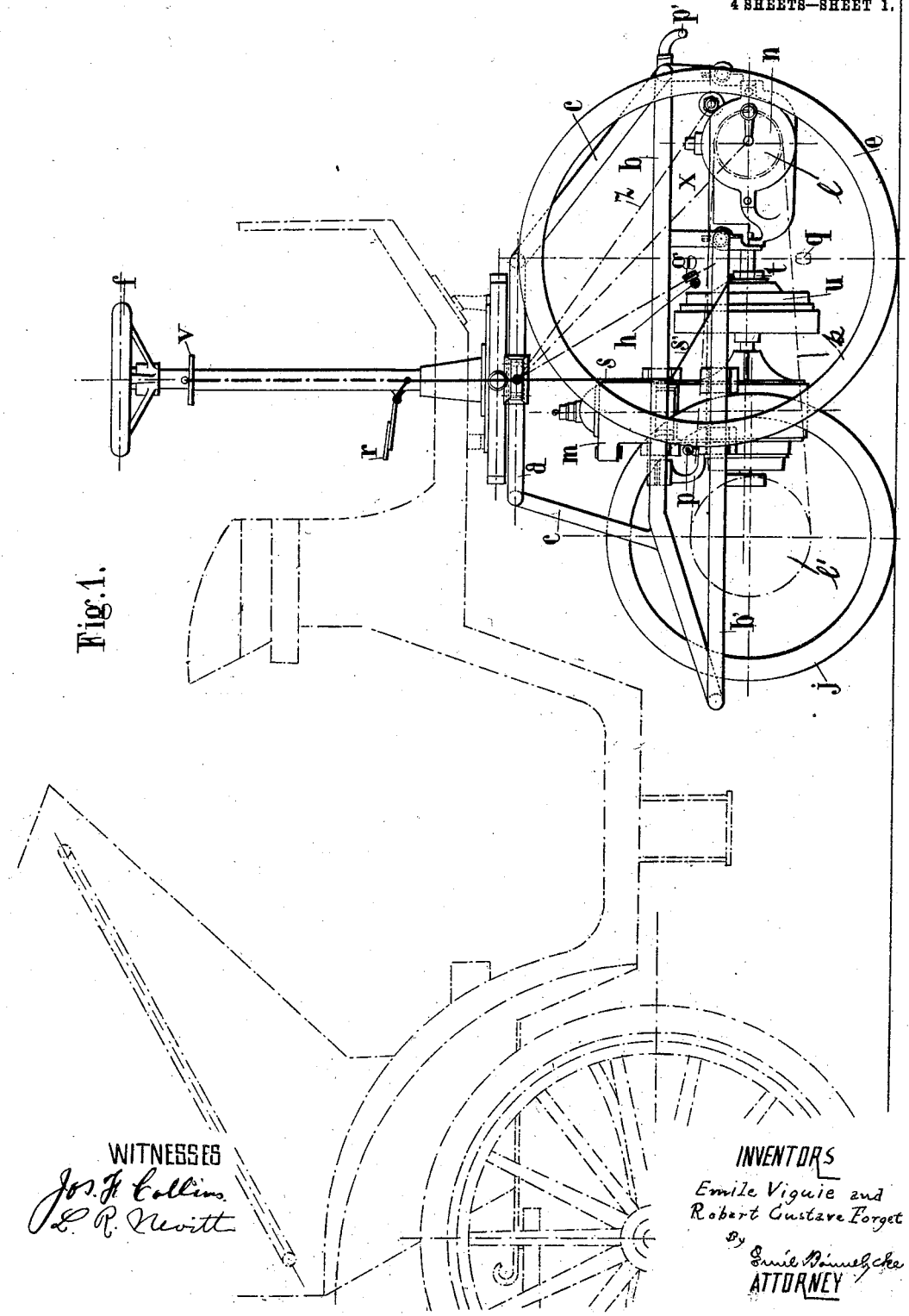
Figure 5:
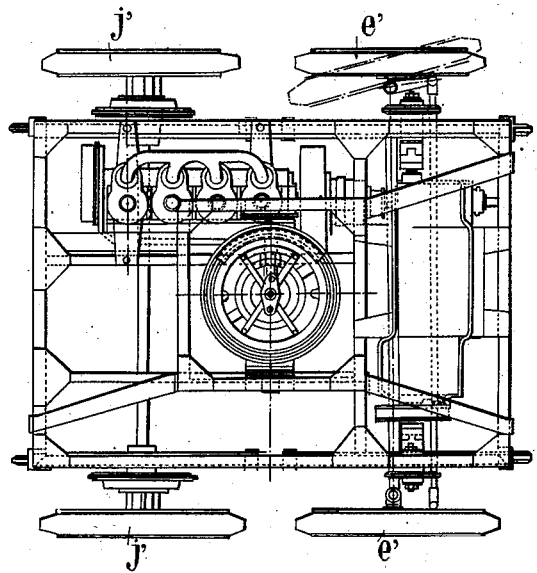

Figures 1, 1ª, 2 and 3 depict a construction with three wheels. Fig. 1 is a side elevation of the motor fore-carriage adapted to the front of a hackney carriage of the victoria type. Fig. 1ª is a fragmentary top plan view of the means for attaching the motor fore-carriage to the vehicle, Fig. 2 is a section on line 2—2 of Fig. 1ª, Fig. 3 is a section on line 3—3 of Fig. 1ª, Figs. 4 and 5 show a construction with four wheels, Fig. 4 is a side elevation. Fig. 5 is a plan view.

The machine (Figs. 1–3) consists of a frame made of tubes or sectional steel girders connected in the most suitable or approved form in order to enable the different parts of the device to be secured in their normal positions. It will be sufficient to describe the tubular frame shown in Fig. 1 in which the upper portion *a* is provided with a rim 7 intended for securing the motor fore-carriage to the vehicle. Portion *a*, is connected to the lower portion, constituted of two stepped parts *b* and *b'*, by tubes *c*. To the tubes *b* and *b'* are secured the wheels, the motor, the change speed gear box and all the driving parts and accessories of the mechanism. Two wheels *e*, the steering wheels, are mounted on the frame by the usual means. They are moved by a hand wheel *f* and arranged in front of the box seat. A steering gear controlled by the hand wheel *f* moves the wheels *e* in the desired direction. A third wheel *j* arranged at the back of the chassis is driven by the engine by means of a chain *k* and sprocket wheels *l* and *l'*. The wheel *j* can be provided with two pneumatic or solid tires in order to avoid sliding or skidding. Any type of motor can be used, it being secured to the frame at *m*. The change speed gear box arranged at *n* at 90° relatively to the engine shaft, is suitably connected to the latter. The starting of the car is obtained by pressing with the foot on the pedal *r* which by means of the rods *s* and *s'* and the fork *t* causes movement of the clutch *u*.

The method of attaching the motor fore-carriage will be now explained. By reference to the carriage shown in Fig. 1, it will be seen that to the driver's footboard is secured at several points an inner rim 1, resting by means of a series of spaced flanges 2 on a second rim 3 provided with a series of spaced bosses 4 which have curved outer faces which take the friction of the rim 1 when the auto-bogie is turning. The rim 3 is mounted on trunnions 5 and 6 in the central plane of the vehicle. The said trunnions penetrate into a third or outer rim 7 which in its turn is pivoted at 8 and 9 on parts 10 and 11 secured to the chassis, at its upper portion *a*. The rim 7 is held at 8 and 9 parallel to the axis of the wheels of the motor fore-carriage; that is to say, normally to the trunnions 5 and 6 supporting the rim 3. Arms 12 secured below the rim 3, support at the center of the device, the whole steering apparatus constituted of the hand wheel and other accessories. Owing to the movement made by the rims 3 and 7 about the trunnions 5 and 6, 8 and 9, any of the three wheels of the motor fore-carriage can rise or descend without thereby affecting the driver's seat.

The motor fore-carriage in the construction shown in Figs. 4–5 has the general arrangement previously described for securing the device to the body of the vehicle and comprises four wheels; two supporting and driving wheels *j'* and two steering wheels *e'* arranged, as in ordinary motor cars, at a distance from the driving wheels. The frame can be made of tubes or sectional iron. The motor may be vertical, inclined or horizontal. The means for guiding the steering wheels is similar to that existing in ordinary motor vehicles, and forms no part of the present invention.

What is claimed is:

1. In a motor fore-carriage, for connection with a vehicle body, in combination with a wheeled frame, an outer rim, trunnions for securing said rim to said frame, a second rim, trunnions secured to said second rim and to said outer rim at right angles to said first trunnions, an inner rim having a series of spaced flanges which overlie and engage said second rim, a series of spaced bosses on the second rim which engage said inner rim, and means for securing said inner rim to the vehicle body, the second rim being turnable with respect to the inner rim.

2. In a motor fore-carriage for connection with a vehicle body, in combination with a wheeled frame, an outer rim, trunnions for securing said rim to said frame, a second rim, trunnions secured to said second rim and to said outer rim at right angles to the first trunnions, an inner rim having a series of outwardly projecting flanges at its top which overlie and engage the second rim, a series of spaced bosses having curved outer faces on the inner circumference of the second rim, said bosses being for engagement with the periphery of the inner rim, and means for securing the inner rim to the vehicle body, the second rim being turnable with respect to the inner rim.

In testimony whereof we have signed this specification in the presence of two subscribing witnesses.

EMILE VIGUIE.
ROBERT GUSTAVE FORGET.

Witnesses:
  EMILE LEDRET,
  H. C. COXE.